US011961000B2

(12) United States Patent
Holland (10) Patent No.: US 11,961,000 B2
(45) Date of Patent: Apr. 16, 2024

(54) LOSSY LAYER COMPRESSION FOR DYNAMIC SCALING OF DEEP NEURAL NETWORK PROCESSING

(71) Applicant: QUALCOMM Incorporated, San Diego, CA (US)

(72) Inventor: Wesley James Holland, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1269 days.

(21) Appl. No.: 15/877,204

(22) Filed: Jan. 22, 2018

(65) Prior Publication Data
US 2019/0228284 A1  Jul. 25, 2019

(51) Int. Cl.
| | |
|---|---|
| *G06N 3/084* | (2023.01) |
| *G06N 3/04* | (2023.01) |
| *G06N 3/088* | (2023.01) |
| *G06V 10/764* | (2022.01) |
| *G06V 10/82* | (2022.01) |
| *G06V 20/56* | (2022.01) |
| *G06V 20/58* | (2022.01) |
| *G06F 18/2136* | (2023.01) |

(52) U.S. Cl.
CPC ............... *G06N 3/084* (2013.01); *G06N 3/04* (2013.01); *G06N 3/088* (2013.01); *G06V 10/764* (2022.01); *G06V 10/82* (2022.01); *G06V 20/582* (2022.01); *G06V 20/584* (2022.01); *G06V 20/588* (2022.01); *G06F 18/2136* (2023.01)

(58) Field of Classification Search
CPC .......... G06N 3/04; G06N 3/084; G06N 3/088; G06K 9/42; G06K 9/6249
See application file for complete search history.

(56) References Cited

U.S. PATENT DOCUMENTS

| | | | |
|---|---|---|---|
| 7,769,239 B2 | 8/2010 | Demos | |
| 9,767,410 B1 | 9/2017 | Guevara et al. | |
| 2011/0282508 A1* | 11/2011 | Goutard | H02J 3/06 |
| | | | 700/286 |
| 2016/0217369 A1* | 7/2016 | Annapureddy | G06N 3/082 |
| 2016/0322042 A1 | 11/2016 | Vlietinck et al. | |
| 2016/0379115 A1 | 12/2016 | Burger et al. | |
| 2017/0076195 A1 | 3/2017 | Yang et al. | |
| 2017/0185529 A1* | 6/2017 | Chhabra | G06F 12/145 |
| 2018/0000385 A1* | 1/2018 | Heaton | G08B 25/016 |

(Continued)

OTHER PUBLICATIONS

"Luo et al., ThiNet: A Filter Level Pruning Method for Deep Neural Network Compression, 2017, Proceedings of the IEEE International Conference on Computer Vision (ICCV), pp. 5058-5066" (Year: 2017).*

(Continued)

*Primary Examiner* — Luis A Sitiriche
(74) *Attorney, Agent, or Firm* — ArentFox Schiff LLP (57) ABSTRACT

An apparatus of operating a neural network is configured to compress one or more of activations or weights in one or more layer of the neural network. The activations and/or weights may be compressed based on a compression ratio or a system event. The system event may be a bandwidth condition, a power condition, a debug condition, a thermal condition or the like. The apparatus may operate the neural network to compute an inference based on the compressed activations or the compressed weights.

20 Claims, 7 Drawing Sheets

(56) References Cited

U.S. PATENT DOCUMENTS

| | | | | |
|---|---|---|---|---|
| 2018/0131946 A1* | 5/2018 | Lee | ............................ | G06N 3/08 |
| 2018/0160326 A1* | 6/2018 | Lin | ...................... | G06F 16/2291 |
| 2018/0293758 A1* | 10/2018 | Bar-On | .................... | G06T 9/002 |
| 2018/0299841 A1* | 10/2018 | Appu | ......................... | G06N 3/02 |
| 2019/0080222 A1* | 3/2019 | Glesner | .................. | G06F 3/0608 |
| 2019/0171935 A1* | 6/2019 | Agrawal | ............... | G06N 3/0445 |

OTHER PUBLICATIONS

"Ko et al., Adaptive weight compression for memory-efficient neural networks, 2017, Design, Automation & Test in Europe Conference & Exhibition, pp. 199-204" (Year: 2017).*

"Yao et al., DeepIoT: Compressing Deep Neural Network Structures for Sensing Systems with a Compressor-Critic Framework, 2017, Proceedings fo the 15th ACM Conference on Embedded Network Sensor Systems, Article No. 4, p. 1-14" (Year: 2017).*

"McDanel et al., Incomplete Dot Products for Dynamic Computation Scaling in Neural Network Inference, 2017, 16th IEEE International Conference on Machine Learning and Applications, pp. 186-193" (Year: 2017).*

* cited by examiner

LOSSY LAYER COMPRESSION FOR DYNAMIC SCALING OF DEEP NEURAL NETWORK PROCESSING

BACKGROUND

Field

Certain aspects of the present disclosure generally relate to machine learning and, more particularly, to improving systems and methods of lossy layer compression for dynamic scaling of neural network processing.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

The efficient sizing of bus bandwidth and memory components in a computational device may be useful for optimizing the functional capabilities of processing components of a computational device (e.g., a system on a chip (SOC)). The utilization of memory capacity and bus bandwidth may be further optimized by compressing data so that the data uses less bus bandwidth to transmit and less space in memory for storage. Unfortunately, data/frames may not compress with the same efficiency. As such, neural network designers may be faced with a tradeoff decision: (1) compress using a lossy compression methodology that may produce a lower quality output when decompressed but, benefit from a smaller memory component and bus bandwidth consumption or (2) compress using a lossless compression methodology that may produce a high quality output when decompressed but utilizes relatively larger memory components and bus bandwidths to maintain a satisfactory performance (e.g., quality of service (QoS) or accuracy). In either option, designers may have to size busses and memory components in view of the "practical worst case" of compression or risk reduced accuracy or QoS as measured by any number of key performance indicators (KPIs).

Accordingly, there is a need for a system and method for intelligent compression that utilizes system conditions to adapt compression to improve, and possibly optimize neural network performance.

SUMMARY

The following presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

A deep neural network (DNN) is an artificial neural network with multiple hidden layers of units between the input and output layers. Because of their expressive power, they are increasingly being used to solve a wide range of problems. Although some layers in various DNN architectures may be sparse or low-activity (e.g., rectifier linear unit (ReLU) layers, fully-connected layers, later convolutional layers, etc.), compressible and especially robust to lossy compression, many DNNs are extensively tuned before being used on mobile hardware. As such, small perturbations in the weights and activations of critical layers may result in unacceptable quality lossy (e.g., decreased inference accuracy).

To address the issues of quality loss and increased bandwidth and power consumption in a computational system, aspects of the present disclosure are directed to applying a mixture of lossless and lossy compression to neural network layers as the layers are written to or read from a chip memory.

In an aspect of the disclosure, a method, a computer-readable medium, and an apparatus for operating a computational network are provided. The apparatus includes a memory and at least one processor coupled to the memory. The processor(s) are configured to compress at least one of activations or weights in at least one layer of the neural network based at least in part on a compression ratio and a system event to produce at least one of compressed activations or compressed weights. The processor(s) are further configured to operate the neural network to compute an inference based on the at least one of the compressed activations or the compressed weights.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

In this description, reference to "DRAM" or "DDR" memory components will be understood to envision any of a broader class of volatile random access memory ("RAM") and will not limit the scope of the solutions disclosed herein to a specific type or generation of RAM. That is, it will be understood that various embodiments of the systems and methods provide a solution for managing transactions of data that have been compressed according to lossless and/or lossy compression algorithms and are not necessarily limited in application to compressed data transactions associated with double data rate memory. Moreover, it is envisioned that certain embodiments of the solutions disclosed herein may be applicable to DDR, DDR-2, DDR-3, low power DDR ("LPDDR") or any subsequent generation of DRAM.

As used in this description, the terms "component," "database," "module," "block," "system," and the like are intended to refer generally to a computer-related entity, either hardware, firmware, a combination of hardware and software, software, or software in execution, unless specifically limited to a certain computer-related entity. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or chip may be comprised of one or more distinct processing components generally referred to herein as "core(s)."

In this description, the terms "engine," "processing engine," "processing component," "producer" and the like are used to refer to any component within a system on a chip ("SOC") that generates data and/or frames and transfers them over a bus to or from a memory component. As such, an engine may refer to, but is not limited to refer to, a CPU, DSP, GPU, modem, controller, camera, video recorder, etc.

In this description, the term "bus" refers to a collection of wires through which data is transmitted from a processing engine to a memory component or other device located on or off the SOC. It will be understood that a bus consists of two parts—an address bus and a data bus where the data bus transfers actual data and the address bus transfers information specifying location of the data in a memory component (i.e., address and associated metadata). The terms "width" or "bus width" or "bandwidth" refers to an amount of data, i.e. a "chunk size," that may be transmitted per cycle through a given bus. For example, a 16-byte bus may transmit 16 bytes of data at a time, whereas 32-byte bus may transmit 32 bytes of data per cycle. Moreover, "bus speed" refers to the number of times a chunk of data may be transmitted through a given bus each second. Similarly, a "bus cycle" or "cycle" refers to transmission of one chunk of data through a given bus.

In this description, the terms computational device and "portable computing device" ("PCD") is used to describe any device operating on a limited capacity power supply, such as a battery. Although battery operated PCDs have been in use for decades, technological advances in rechargeable batteries coupled with the advent of third generation ("3G"), fourth generation ("4G") and fifth generation ("5G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

In this description, the terms "lossless" and "lossy" refer to different categories of compression algorithms or methodologies and are not meant to refer to any specific algorithm. Whether a given specific compression algorithm is "lossless" or "lossy" would be recognized by one of ordinary skill in the art. Generally speaking, and as one of ordinary skill in the art would understand, "lossless" and "lossy" are terms that describe whether or not, in the compression of a data set or frame, all original data can be recovered when the file is uncompressed. With "lossless" compression, every single bit of data that was originally in the frame remains after the frame is uncompressed, e.g., all of the information is completely restored. The Graphics Interchange File ("GIF") is an exemplary image format that provides a lossless compression. By contrast, lossy compression algorithms reduce a frame or data set by permanently eliminating certain information, especially redundant information. As such, when a file compressed with a lossy algorithm is decompressed, only a part of the original information is still there (although the user experience may not suffer for it). Lossy compression algorithms may be suitable for video and sound based use cases, for example, as a certain amount of information loss may not be detected by a user. The JPEG image file is an exemplary image format that provides a lossy compression. Using a lossy compression algorithm, designers can decide how much loss to introduce and make a trade-off between file size and output image quality. Although particular aspects are described herein, many variations and permutations of these aspects fall within the scope of the disclosure. Although some benefits and advantages are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description. The detailed description and drawings are merely illustrative of the disclosure rather than limiting, the scope of the disclosure being defined by the appended claims and equivalents thereof.

Lossy Layer Compression for Dynamic Scaling

A deep neural network (DNN) is an artificial neural network with multiple hidden layers of units between the input and output layers. Because of their expressive power, DNNs are increasingly being used to solve a wide range of problems. For example, DNNs have been employed for language processing, speech recognition, image recognition and other applications. Although some layers in various DNN architectures may be sparse or low-activity (e.g., ReLU layers, fully-connected layers, later convolutional layers), compressible and especially robust to lossy compression, many DNNs are extensively tuned before being used on mobile hardware. As such, even small perturbations in the weights and activations of certain layers may result in unacceptable quality lossy (e.g., reduce inference accuracy).

Aspects of the present disclosure are directed to saving bandwidth and power inside a computational system by applying a mixture of lossless and lossy compression to network layers. The mixture may be applied to the network layers as the layers are written to or read from memory (e.g., DRAM, SRAM, cache, etc.), for example. In some aspects, techniques for controlling a level of lossy compression may be based on a given layers robustness or sensitivity to noise (captured in a layer robustness map) or system-level conditions such as bandwidth (BW), power consumption, thermal activity or conditions, debug conditions, and the like, for example. In accordance with aspects of the present disclosure, a layers compression map may be determined based on neural network heuristics, sparsity estimates, and network performance profiling. In some aspects, noise-sensitive layers may be configured using lossless or high-quality lossy compression while other layers are configured using lossy compression. In some aspects, the compression map may be based on user-defined loss levels (e.g., specified acceptable loss levels) in accordance with certain bandwidth and thermal profiles (e.g., given certain thermal, power or bandwidth conditions).

Figure 1:
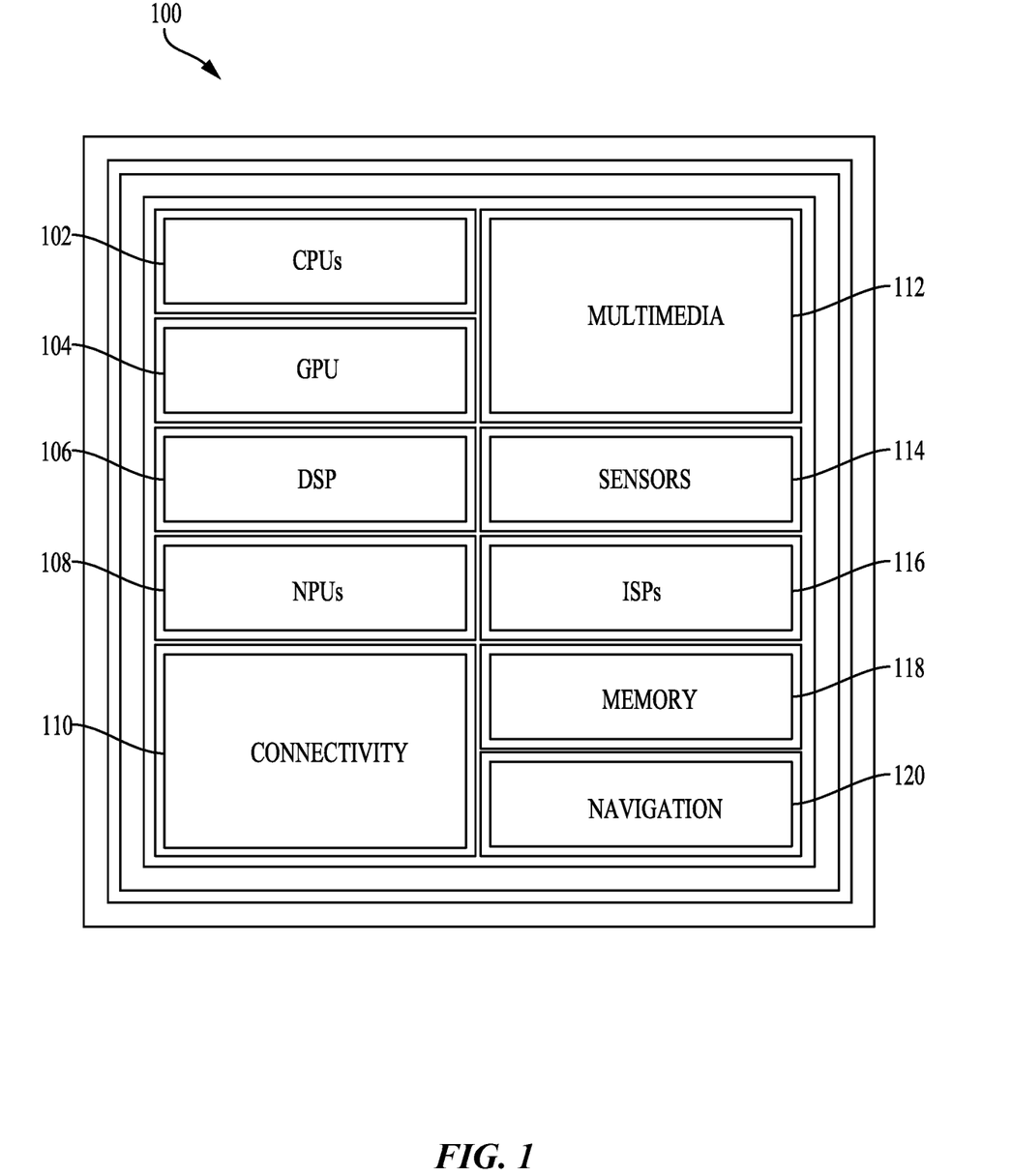
FIG. 1 illustrates an example implementation of designing a neural network using a system-on-a-chip (SOC), including a general-purpose processor in accordance with certain aspects of the present disclosure.

FIG. 1 illustrates an example implementation of a system for operating a computational network such as a neural network to compute an inference using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a Neural Processing Unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code for compressing at least one of activations or weights in at least one layer of the neural network based at least in part on a compression ratio and a system event. The instructions loaded into the general-purpose processor 102 may also comprise code for operating the neural network to compute an inference based on the at least one of compressed activations or compressed weights.

Figure 2:
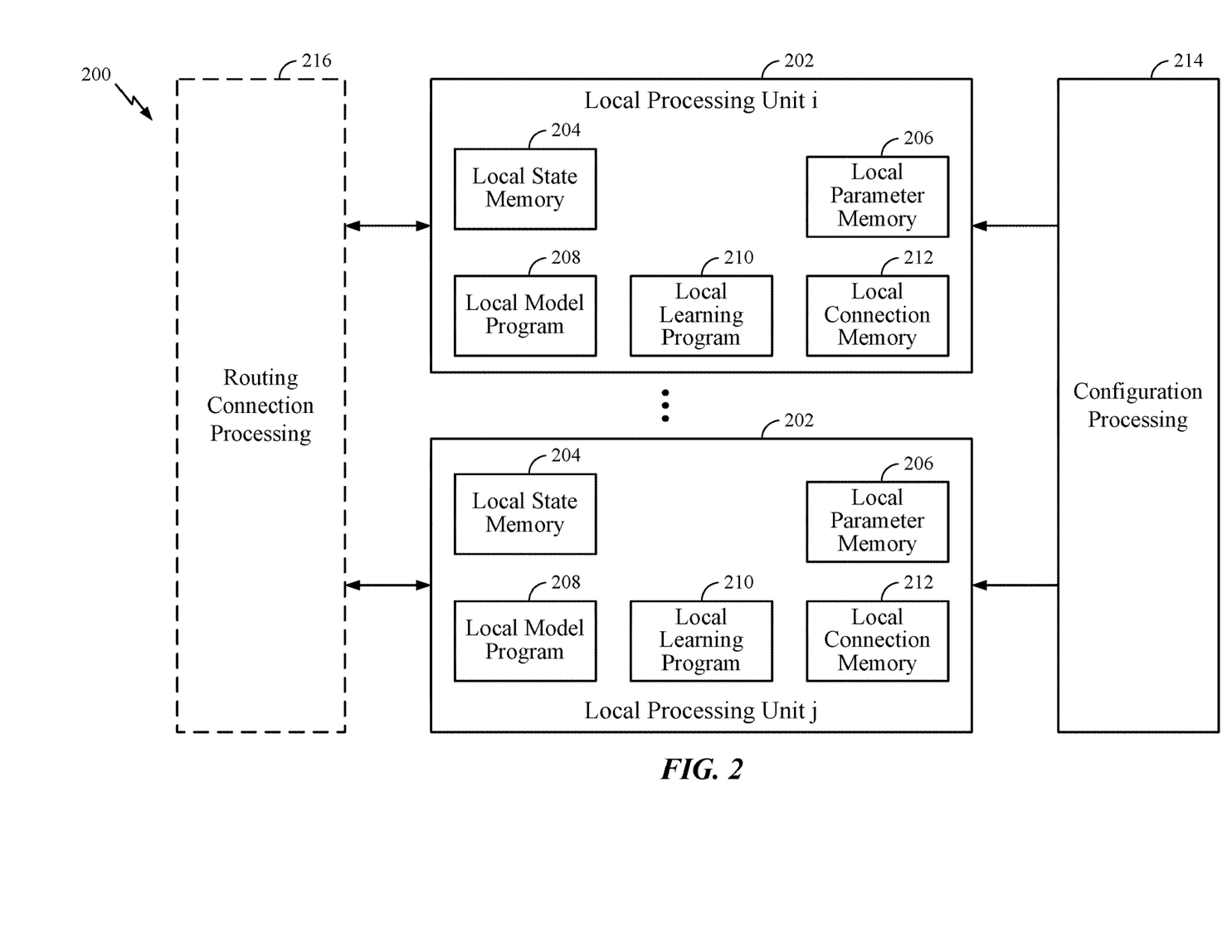
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In other words, a deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Computational networks such as neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
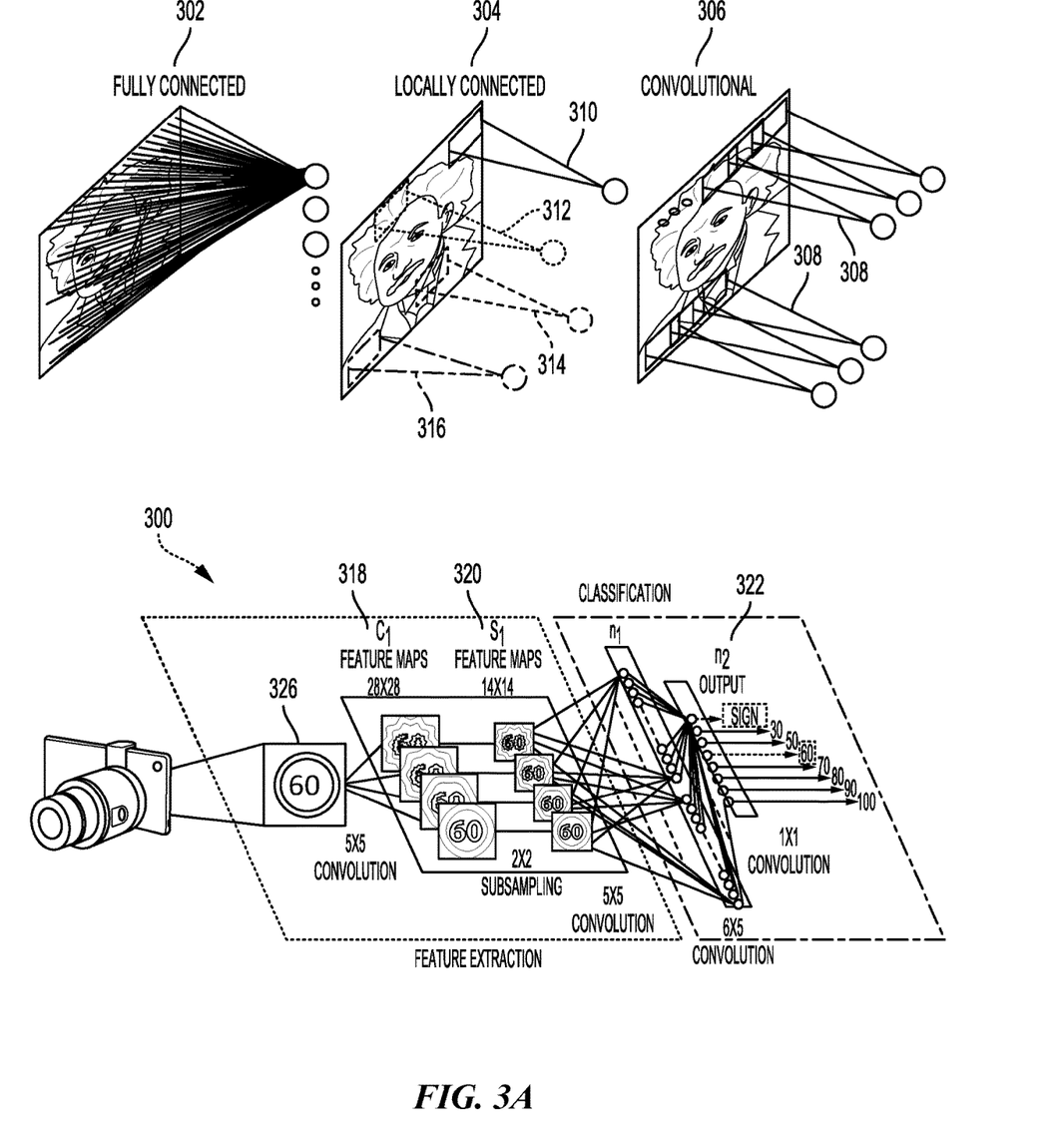
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

One type of computational network is a deep convolutional network (DCN). Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
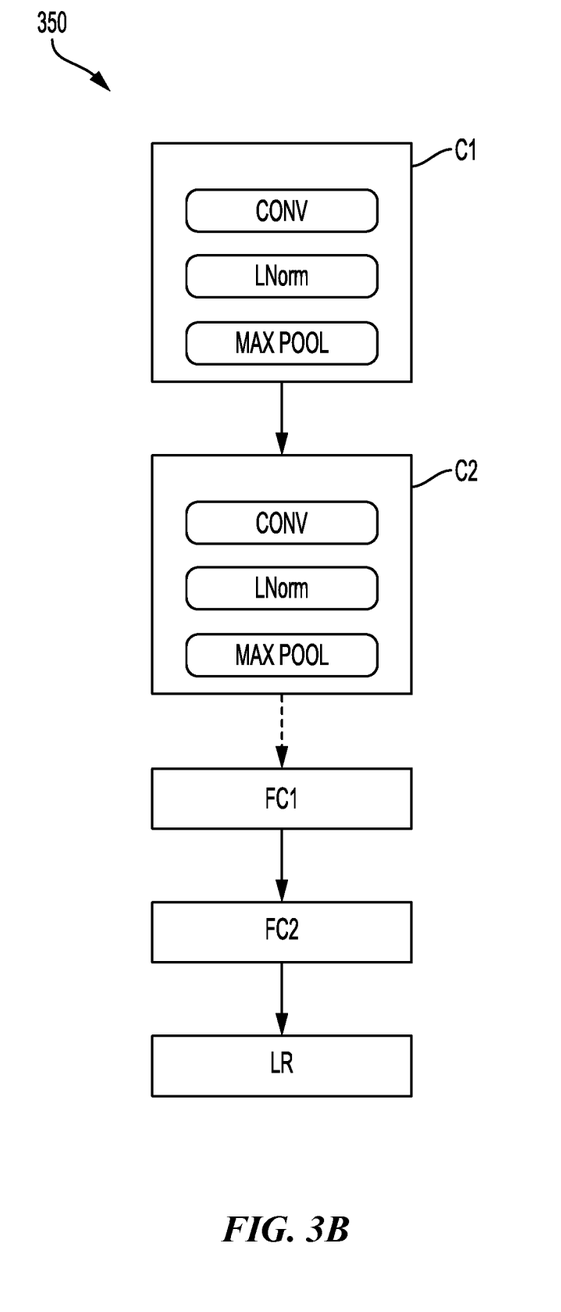
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
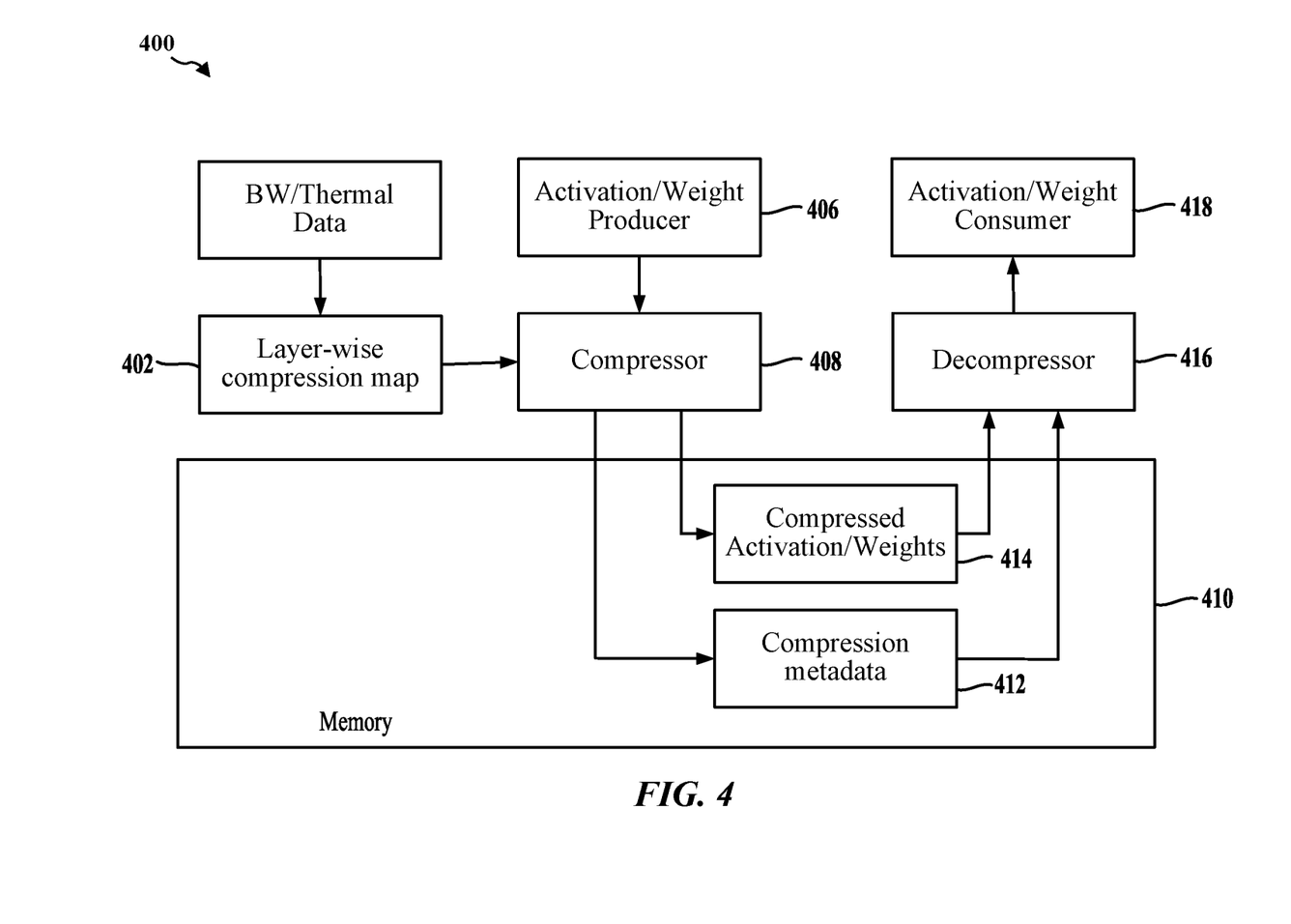
FIG. 4 is a block diagram illustrating exemplary system architecture in accordance with aspects of the present disclosure.

FIG. 4 is a block diagram illustrating exemplary system architecture in accordance with aspects of the present disclosure. As shown in FIG. 4, the system architecture 400 may include a compression map unit 402, a producer unit 406, a compressor unit 408, and a memory unit 410. The producer unit 406 consumes activations and weights and produces an activation for subsequent layer of a neural network. The weights may comprise connection weights in a computational network such as a DNN, for example. The weights may be coefficients that scale an input to a node (e.g., neuron) in the network. Activations are values that are output from a node and passed to a node in the next layer of the network.

The producer units 406 may comprise, for example, a CPU (e.g., CPU 102), or other processing unit (e.g., GPU 104) of the computational network. The producer unit 406 generates an output (e.g., memory bandwidth) including weights and activations for the next layer of the computational network that are supplied to the compressor unit 408. Although one producer unit 406 is shown in FIG. 4, this is merely exemplary and not limiting and any number of producers may be included in the system architecture 400. The compressor unit 408 applies a compression algorithm based on a layer-wise compression map from the compression map unit 402 to compress the memory bandwidth (e.g., activations and/or weight). Applying the compression algorithm, the compressor unit may leverage existing sparsity in a layer and/or increase the sparsity in a layer to reduce the computations to be performed in the compressed layer. In one example, the compression algorithm may be a rectifier which sets weight values (or activations) that are less than 0.5 to zero. As such, computations using such value may be skipped thereby reducing the computations performed in a layer. In some aspects, the compression map may specify a compression ratio (e.g., 60%) to be applied at a particular layer of the computational network.

The compression map unit 402 may generate the compression map based on one or more system events, for instance. The system events may include but are not limited to a bandwidth condition, a thermal condition, a debug condition, or a power condition. For example, where the temperature of the computational system or a portion thereof (e.g., SOC 100) exceeds a temperature threshold, the compression map unit 402 may generate a compression map to produce a larger compression ratio (e.g., 70%). Because operation of the processors in performing the computations increases the temperature of the computational network, reducing the computations performed may reduce the temperature of the computational network. That is, by compressing the data more, the computational load may be reduced and in turn the temperature may be reduced. On the other hand, in a second example, if the available bandwidth is above a bandwidth threshold, the compression map unit 402 may generate a compression map to produce a lower compression rate (e.g., 30%). That is, by compressing the data less, the accuracy of the computational network (e.g., in computing an inference) may be increased.

In some aspects, the compression ratio may be set based on the type of layer in the computational network (e.g., DCN 350), or the sensitivity to noise for a given layer. For example, a lower ratio of compression may be applied in fully-connected layers or convolution layers and a greater ratio of compression may be applied for pooling layer.

The compressor unit 408 may also generate compression metadata 412 which may indicate how the data was compressed. The compression data may include information for uncompressing the compressed data (e.g., using a complementary algorithm to that used for compressing the data). For instance, the compression metadata may indicate a unit or node number, a size, a type or other attribute for the compressed weight or activation. The compressed activations/weights 414 may be stored along with the compression metadata 412 in memory 410.

When the compressed weights or activations are to be read, a decompressor unit 416 uses the compression metadata 412 to decompress the compressed activations/weights 414 (e.g., using a complement to the compression algorithm). The decompressed activations and weights may then be supplied to consumer unit 418. The consumer may comprise for example a hardware accelerator, a CPU, or other processing element. Of course, in some aspects, the consumer unit 418 may be the same block as the producer unit 406. For example, a hardware accelerator may consume activations that it produced during the processing of the preceding layer. Thus, the hardware accelerator may serve as both the producer unit 406 and the consumer unit 418. In some aspects, the consumer unit 418 may consume or utilize compressed data from multiple producers. For instance, a hardware accelerator may consume activations that it produced itself while also consuming weights that were produced by the CPU.

Figure 5:
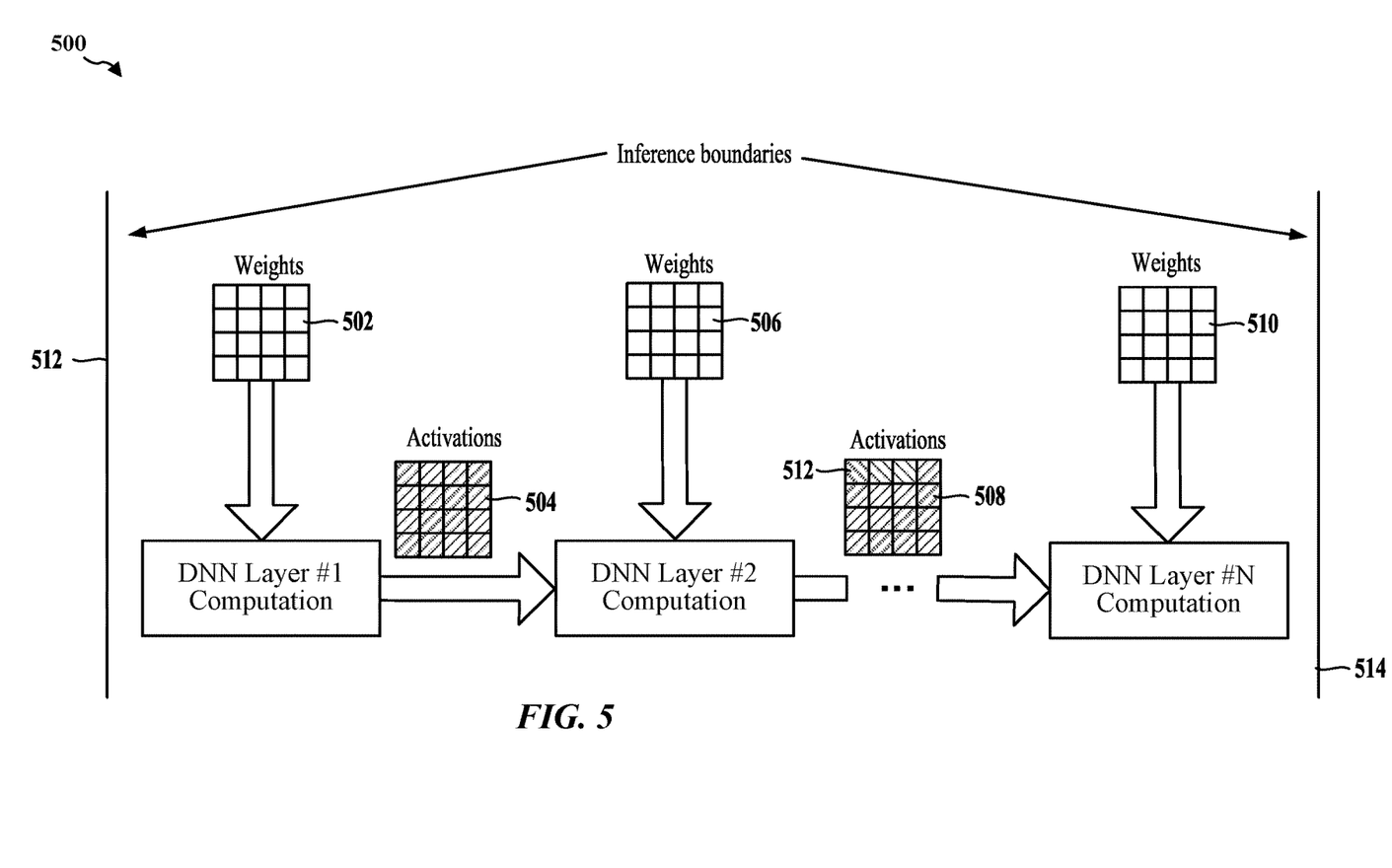
FIG. 5 is a block diagram illustrating a data processing flow in accordance with aspects of the present disclosure.

FIG. 5 is a block diagram illustrating a data processing flow 500 in accordance with aspects of the present disclosure. Referring to FIG. 5, a CPU may specify a particular model including weights 502 which are fed into a layer 1 computation at a first end of an inference boundary 512. After layer 1 has been computed, activations 504 may be compressed and sent out to memory with a determined compression rate. In some aspects, the weights 502 may also be compressed and stored in memory. The activations are then decompressed and read in along with the weights 506 for the next layer (e.g., layer 2) computation. The process may be repeated such that after layer N−1 (e.g., layer 2) has been computed, activations 508 may be compressed and sent out to memory with a determined compression rate. The activation 508 may then decompressed and read from memory. In turn, the activations and weights 510 may be supplied to the layer N for computation of an output or an inference at a second end of the inference boundary.

For each layer of the computational network (e.g., DCN 350), a different compression rate may be specified. For example, a lossless compression may be applied for weights 502 of layer 1 and weights 506 of layer #2, while a lossy compression may be applied to weights in layer N. In lossless compression, each unit (e.g., within weights 502), which may be made out of a fixed memory size (e.g., 256 Bytes), is compressed or reduced to a smaller or minimum possible size without loss of features. That is, the units are compressed to a size such that the units may be later decompressed to produce identical or nearly identical data to the unit prior to compression. In lossy compression, a unit is compressed (e.g., a unit of activations 504) to a level in which there some loss of features. That is, the units are compressed or reduced to a smaller or minimum possible size such that the units may be later decompressed to be approximately equal, but not identical to the unit prior to compression.

Additionally, a different compression may be applied for weights and activations. For instance, a lossless compression may be applied to weights 506 of layer 2, while a second lossy compression (different than the first lossy compression) may be applied to the activations 504 supplied to layer 2.

The compression for the weight or activations may be determined based on a compression ratio. The compression ratio (e.g., 50%, no compression) may be specified based on a compression map (e.g., such as a compression map produced via compression map unit 402). The compression map may be generated based on a system event such as a bandwidth condition, a power condition, a debug condition, or a thermal condition, for example. In some aspects, the compression map may be determined based on the type of layer (e.g., convolution layer or pooling layer) or based on noise sensitivity (e.g., whether the unit to be compressed is an activation or a weight). Table 1 provides an example illustrating the compression ratio may vary based on bandwidth or thermal conditions.

TABLE 1

|  | Condition #1 (No BW/thermal event) | | Condition #2 (medium BW/thermal event) | | | Condition #K (high BW/thermal event) | |
| --- | --- | --- | --- | --- | --- | --- | --- |
|  | Input Weights | Input Activations | Input Weights | Input Activations | ... ... | Input Weights | Input Activations |
| Layer 1 (Convolution) | Lossless | Uncompressed | Lossless | Uncompressed | ... | Lossless | Uncompressed |

TABLE 1-continued

|  | Condition #1 (No BW/thermal event) | | Condition #2 (medium BW/thermal event) | | | Condition #K (high BW/thermal event) | |
| --- | --- | --- | --- | --- | --- | --- | --- |
|  | Input Weights | Input Activations | Input Weights | Input Activations | | Input Weights | Input Activations |
| Layer 2 (Pooling) | Lossless | Lossless | Lossy (50% CR) | Lossy (50% CR) | ... ... | Lossy (50% CR) | Lossy (50% CR) |
| ... | | | | | ... | | |
| Layer N-1 (Fully Connected) | Lossless | Lossless | Lossless | Lossless | ... | Lossy (70% CR) | Lossless |
| Layer N (Softmax) | Lossless | Lossless | Lossless | Lossless | ... | Lossy (70% CR) | Lossy (70% CR) |

As shown in the example of Table 1, when the bandwidth or temperature are in a first condition or state or below a first threshold (e.g., no BW/thermal event), a compression map may be generated such that the weights of the convolution and fully connected layers are compressed using a lossless-type compression. On the other hand, the input activations for the convolution layer may be wholly uncompressed while the fully connected layer may be compressed with lossless-type compression. If the bandwidth or thermal condition exceed a second threshold (e.g., medium BW/thermal event), the compression map may be adapted such that the pooling layer weights and activations may be compressed at a 50% compression ratio (CR). If the bandwidth or thermal condition exceeds a third threshold, (e.g., high BW/threshold), the compression map may be adapted such that the fully connected and softmax layer weights may be compressed at a 70% compression ratio. Of course, the number of thresholds and the layers adapted are merely exemplary and not limiting. Additionally, while the bandwidth and thermal events are shown as triggering a common condition, the bandwidth and thermal events may have different thresholds and may trigger different conditions which may result in different compression maps for the different layers.

Furthermore, the compression map and in turn the compression applied may be adapted during computation of an inference. In some aspects, the compression may be adapted mid-layer. For example, as shown in FIG. 5, a lower level of compression may be applied (e.g., in response to power consumption dropping below a threshold) to the first three units (512) of activations 508, while a higher level of compression is applied to the remaining units of activations 508.

Table 2 is an example illustrating the compression ratio may vary based on the layer of the neural network and based on whether the compression is applied to weights or activations. For instance, the weights of a convolution layer may be compressed using a lossless-type of compression. On the other hand, the weights of a Softmax layer may be compressed using a lossy-type compression (30% compression ratio).

TABLE 2

|  | Input Weights | Input Activations |
| --- | --- | --- |
| Layer 1 (Convolution) | Lossless | Uncompressed |
| Layer 2 (Pooling) | Lossy (50% CR) | Lossy (50% CR) |
| ... | | |
| Layer N-1 (Fully Connected) | Lossless | Lossless |
| Layer N (Softmax) | Lossy (30% CR) | Lossless |

Figure 6:
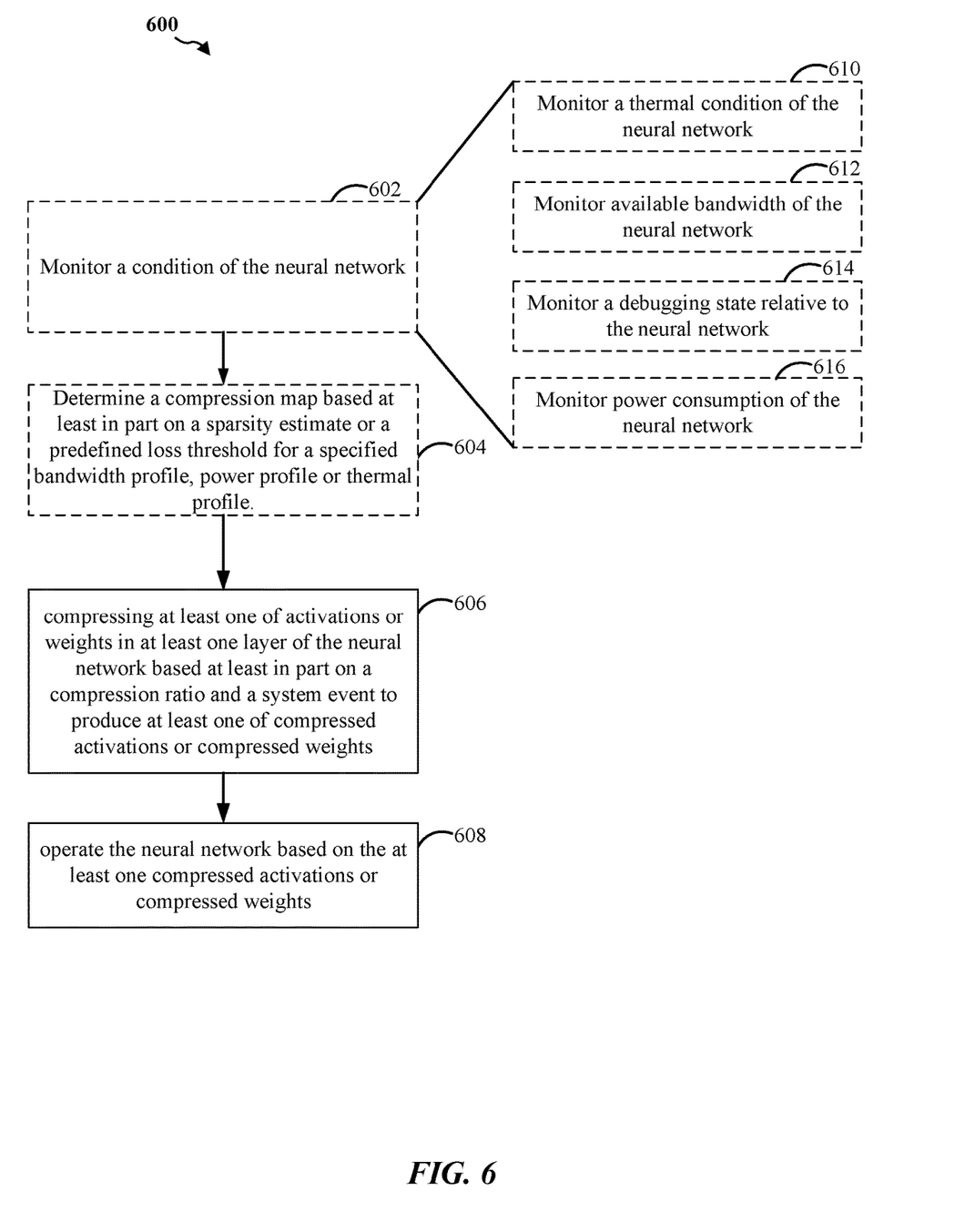
FIG. 6 illustrates a method for operating a neural network in accordance with aspects of the present disclosure.

FIG. 6 illustrates a method 600 for operating a neural network. In block 602, the method may optionally monitor a system condition. In block 610, the method may optionally monitor a thermal condition of the neural network. For example, a sensors 114 may include a thermal sensor to detect a temperature for the network or a component thereof (e.g., SOC 100). In block 612, the method may optionally monitor the available bandwidth of the neural network. For example, the network may be configure with code to monitor the performance (e.g., CPU utilization) of producer units (e.g., 406) and consumer units (e.g., 418) along with the memory throughput of a memory unit (e.g., 410). The CPU utilization and memory throughput may, in turn be used to calculate the available bandwidth. In block 614, the method may optionally monitor the debugging condition relative to the neural network. For example, the neural network may be configured to monitor for debugging conditions (e.g., memory errors) In block 616, the method may optionally monitor the power consumption of the neural network. For example, sensors 114 may include sensors to detect power usage by components of the neural network. In some aspects, the neural network may be configured with code to monitor utilization of certain components (e.g., CPU 102) which may in turn be used to compute the power consumption.

In block 604, the process may optionally determine a compression map based on a sparsity estimate or a predefined loss threshold for a specified bandwidth profile, power profile or thermal profile. A sparsity estimate is an estimate of the number of zero-valued elements in a given set (e.g., weight vector). The predefined loss threshold may comprise a threshold for accuracy or acceptable error. The bandwidth profile, power profile and thermal profile, may each include predefined operating conditions of interest (e.g., available bandwidth >90%) for which a compression ratio may be specified for inclusion in the compression map.

In block 606, the method may compress at least one of activations or weights in at least one layer of the neural network based at least in part on at least one of a compression ratio or a system event. The system event may comprise at least one of a bandwidth condition, a power condition, a debug condition, or a thermal condition. For example, a thermal condition of a computational system may be monitored via sensors (e.g., sensors 114) and may be compared to one or more thresholds. Accordingly, when the thermal condition is such that the temperature is above a threshold, the compression ratio may be adjusted and in turn, the compression applied to a layer may be changed. For example, as shown in the example of Table 1, if the temperature is above a high threshold (e.g., Condition K), the fully connected layer may be compressed based on a 70% compression ratio.

In some aspects, the compression ratio may be adapted mid-layer in response to a change in the bandwidth condition, debug condition, power condition, thermal condition or other system events. Additionally, in some aspects, the compression may be performed during the computation of an inference. That is the compression may be performed outside of training and during compute an inference in the operation of the neural network.

In block 608, the method operates the neural network to compute an inference based on the at least one of the compressed activations or compressed weights. For example, the inference may comprise an estimate of a likelihood that input image data includes a particular object (e.g., car).

In one configuration, an apparatus is configured for compressing at least one of activations or weights in at least one layer of the neural network based at least in part on a compression ratio and a system event. The apparatus is also configured for operating the neural network to compute an inference based on the at least one of compressed activations or compressed weights. The apparatus includes a compressing means and/or operating means. In one aspect, the compressing means and/or operating means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

In some aspects, method 600 may be performed by the SOC 100 (FIG. 1) or the system 200 (FIG. 2). That is, each of the elements of method 600, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A computer-implemented method of operating a neural network, comprising:
generating, at a processor, a compression mapping table based at least in part on at least one of a sparsity estimate or a loss threshold for a selected bandwidth, power, or thermal profile, wherein the compression map table comprises at least one column indicating a specific compression ratio for both a weight and an activation associated with each different system event and a plurality of table rows, each row of the plurality of tables rows corresponding to a specific layer of the neural network;
determining, at the processor, a first compression ratio for a first layer of the neural network based on a first threshold associated with a system event using the compression mapping table and detection of a layer type of the first layer in the neural network;
compressing, via the processor, at least one of activations or weights in the first layer of the neural network based at least in part on the first compression ratio and detection of the system event to produce at least one of compressed activations or compressed weights;
generating compression metadata indicating how data was compressed; and
operating, via the processor, the neural network to compute an inference based on the at least one of the compressed activations or the compressed weights.

2. The computer-implemented method of claim 1, wherein the compressing occurs during computation of an inference.

3. The computer-implemented method of claim 1, wherein the first compression ratio is adapted mid-layer in response to a change in at least one of a power condition, a bandwidth condition, a debug condition, or a thermal condition.

4. The computer-implemented method of claim 1, wherein the system event comprises a bandwidth condition and a thermal condition.

5. The computer-implemented method of claim 1, further comprising:
determining a second compression ratio for a second layer of the neural network different from the first layer based on a second threshold associated with the system event and detection of a layer type of the second layer in the neural network, the second compression ratio being different from the first compression ratio; and
determining a third compression ratio for a third layer of the neural network different from the first layer and the second layer based on a third threshold associated with the system event and detection of a layer type of the third layer in the neural network, the third compression ratio being different from the first compression ratio and the second compression ratio.

6. The computer-implemented method of claim 1, wherein the compression map indicates different compression ratios between multiple layers of the neural network based on different thresholds associated with one or more system events of the neural network.

7. The computer-implemented method of claim 1, further comprising compressing, via the processor, both a weight and an activation in the first layer of the neural network based at least in part on the first compression ratio and detection of the system event to produce at least one of compressed activations or compressed weights.

8. An apparatus of operating a neural network, comprising:
a memory; and
at least one processor coupled to the memory, the at least one processor being configured to:
generate a compression mapping table based at least in part on at least one of a sparsity estimate or a loss threshold for a selected bandwidth, power, or thermal profile, wherein the compression mapping table comprising at least one column indicating a specific compression ratio for both a weight and an activation associated with each different system event and a plurality of table rows, each row of the plurality of tables rows corresponding to a specific layer of the neural network;
determine a compression ratio for a first layer of the neural network based on a threshold associated with a system event using the compression mapping table and detection of a layer type of the first layer in the neural network;
compress at least one of activations or weights in the first layer of the neural network based at least in part on the compression ratio and detection of the system event to produce at least one of compressed activations or compressed weights;
generate compression metadata indicating how data was compressed; and
operate the neural network to compute an inference based on the at least one of the compressed activations or the compressed weights.

9. The apparatus of claim 8, wherein the at least one of the activations or the weights in the first layer of the neural network is compressed during computation of an inference.

10. The apparatus of claim 8, wherein the system event comprises a bandwidth condition and a thermal condition.

11. The apparatus of claim 8, wherein the at least one processor is further configured to adapt the compression ratio at mid-layer in response to a change in at least one of a power condition, a debug condition, a bandwidth condition or a thermal condition.

12. An apparatus for operating a neural network, comprising:
means for generating, at a processor, a compression mapping table based at least in part on at least one of a sparsity estimate or a loss threshold for a selected bandwidth, power, or thermal profile, wherein the compression map table comprises at least one column indicating a specific compression ratio for both a weight and an activation associated with each different system event and a plurality of table rows, each row of the plurality of tables rows corresponding to a specific layer of the neural network;
means for determining a compression ratio for a first layer of the neural network based on a threshold associated with a system event using the compression mapping table and detection of a layer type of the first layer in the neural network;
means for compressing at least one of activations or weights in the first layer of the neural network based at least in part on the compression ratio and detection of the system event to produce at least one of compressed activations or compressed weights;
means for generating compression metadata indicating how data was compressed; and means for operating the neural network to compute an inference based on the at least one of the compressed activations or the compressed weights.

13. The apparatus of claim 12, wherein the means for compressing is configured to be performed during computation of an inference.

14. The apparatus of claim 12, further comprising means for adapting the compression ratio at mid-layer in response to a change in at least one of a power condition, a debug condition, a bandwidth condition or a thermal condition.

15. The apparatus of claim 12, wherein the system event comprises a bandwidth condition and a thermal condition.

16. A non-transitory computer-readable medium storing computer executable code for operating a neural network, comprising code to:

generate a compression mapping table based at least in part on at least one of a sparsity estimate or a loss threshold for a selected bandwidth, power, or thermal profile, wherein the compression mapping table comprising at least one column indicating a specific compression ratio for both a weight and an activation associated with each different system event and a plurality of table rows, each row of the plurality of tables rows corresponding to a specific layer of the neural network;

determine a compression ratio for a first layer of the neural network based on a threshold associated with a system event using the compression mapping table and detection of a layer type of the first layer in the neural network;

compress at least one of activations or weights in the first layer of the neural network based at least in part on the compression ratio and detection of the system event to produce at least one of compressed activations or compressed weights;

generate compression metadata indicating how data was compressed; and operate the neural network to compute an inference based on the at least one of the compressed activations or the compressed weights.

17. The non-transitory computer-readable medium of claim 16, wherein the at least one of the activations or the weights in the first layer of the neural network is compressed during computation of an inference.

18. The non-transitory computer-readable medium of claim 16, wherein the system event comprises a bandwidth condition and a thermal condition.

19. The non-transitory computer-readable medium of claim 18, further comprising code to determine the compression ratio using a compression map, the compression map being specified based at least in part on at least one of sparsity estimates or a loss threshold for a specified bandwidth, a power level, a debug state, or a thermal profile.

20. The non-transitory computer-readable medium of claim 16, further comprising code to adapt the compression ratio at mid-layer in response to a change in at least one of a power condition, a debug condition, a bandwidth condition or a thermal condition.

* * * * *